United States Patent [19]

Gross et al.

[11] Patent Number: 4,980,873
[45] Date of Patent: Dec. 25, 1990

[54] ULTRASONIC TRANSDUCER WITH TENSIONED DIAPHRAGM AND METHOD

[76] Inventors: William C. Gross, 59 Skagit Key, Bellevue, Wash. 98006; Dean D. Campbell, 6227 26th Ave., NE., Seattle, Wash. 98115; James N. Kniest, 611 Alder St., Edmonds, Wash. 98020

[21] Appl. No.: 361,735

[22] Filed: Jun. 2, 1989

Related U.S. Application Data

[63] Continuation of Ser. No. 130,983, Dec. 10, 1987, abandoned.

[51] Int. Cl.$^5$ .............................................. H04R 19/00
[52] U.S. Cl. ..................................... 367/181; 367/140; 181/172
[58] Field of Search .................... 310/309; 367/87, 99, 367/140, 174, 181, 188; 381/116, 174, 191, 192, 193, 169, 176, 188, 205; 181/123, 157, 161, 171, 172

[56] References Cited

U.S. PATENT DOCUMENTS

| | | | |
|---|---|---|---|
| 4,081,626 | 3/1978 | Muggli et al. | 367/181 X |
| 4,439,641 | 3/1984 | Paglia | 367/181 X |
| 4,440,482 | 4/1984 | Shenk | 367/181 |
| 4,695,986 | 9/1987 | Hossack | 367/140 |
| 4,769,793 | 9/1988 | Kniest et al. | 367/99 |

Primary Examiner—Brian S. Steinberger

[57] ABSTRACT

A diaphragm tensioning arrangement for a Sell-type ultrasonic transducer assembly is disclosed. The transducer includes a fixed backplate having a substantially planar electrically conductive front surface and a diaphragm having a front surface and back surface, the back surface of the diaphragm overlying the substantially planar surface of the backplate. The diaphragm includes an insulating layer adapted to contact the backplate and a conducting layer electrically isolated therefrom. The diaphragm tensioning arrangement includes means for applying a load to the front surface of the diaphragm in order to maintain diaphragm tension. A groove disposed in the backplate extension or base has at least one groove opening into its front surface. A tension element engages the front surface of the diaphragm pressing a portion thereof into the groove in order to maintain diaphragm tension. If creep occurs within the diaphragm, the tension element which is substantially constantly loaded, presses the diaphragm further into the groove thereby compensating for diaphragm creep. The tension element may be loaded by a variety of means with a preferred embodiment incorporating a wave spring placed directly above the tension element.

13 Claims, 3 Drawing Sheets

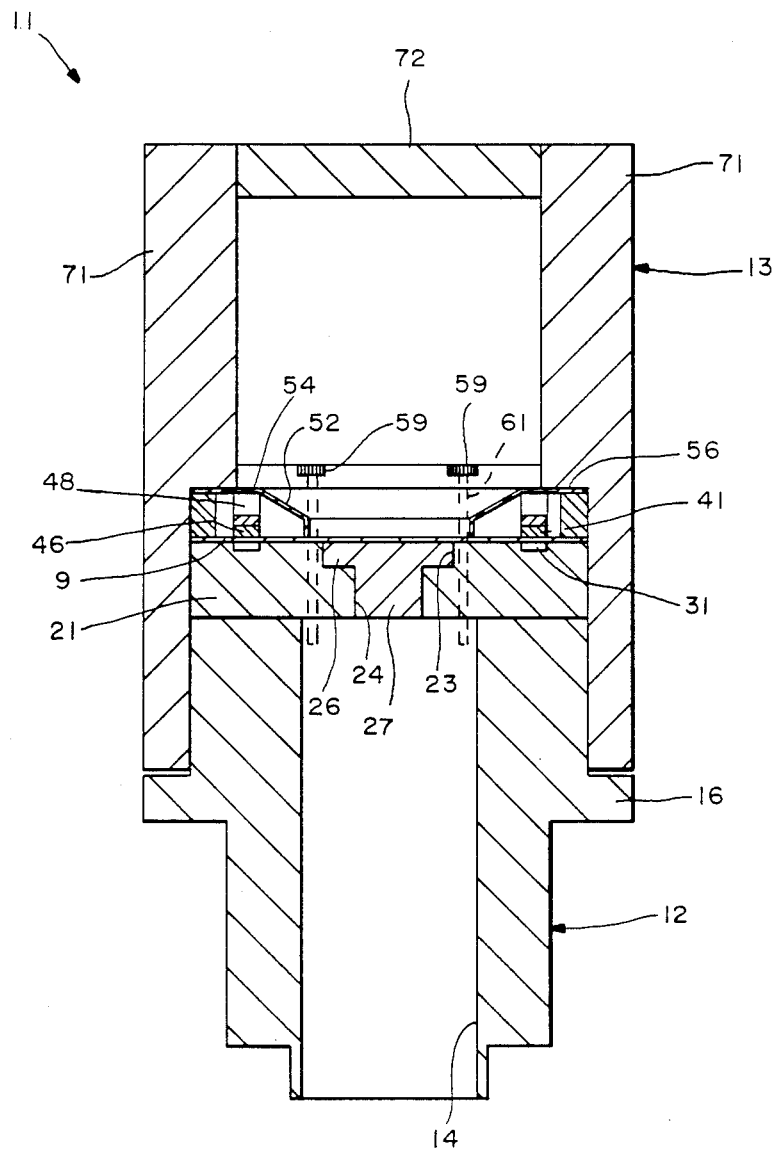
FIG.—1

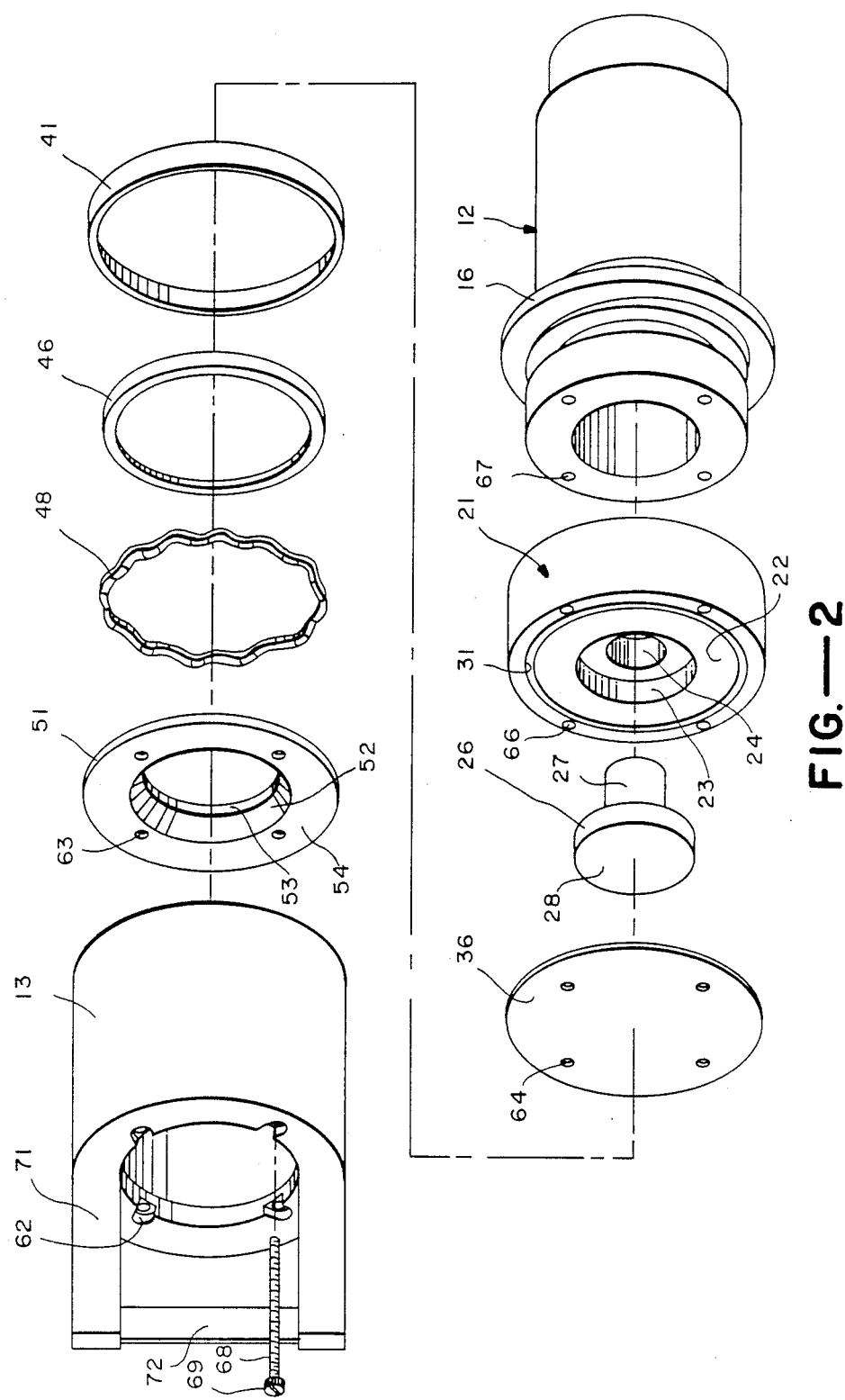

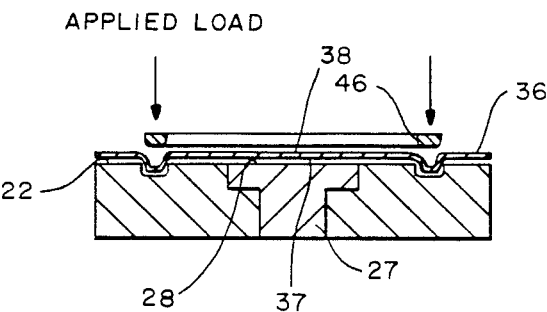
FIG.—3
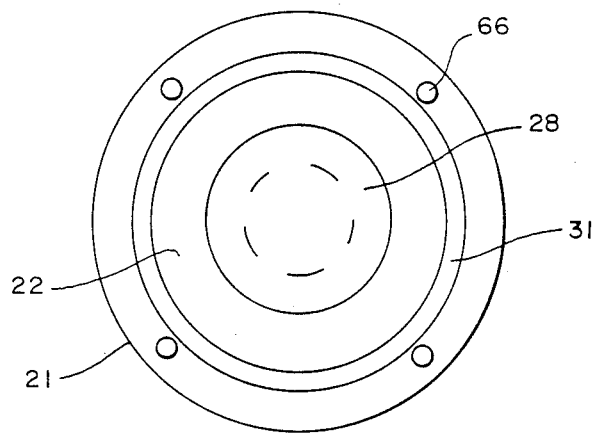
FIG.—4
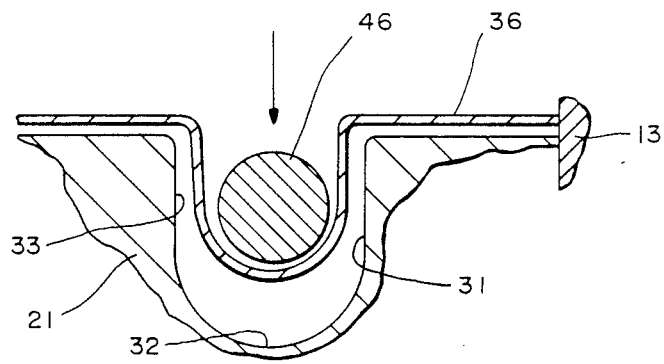
FIG.—5

ULTRASONIC TRANSDUCER WITH TENSIONED DIAPHRAGM AND METHOD

This is a continuation, of application Ser. No. 130,983 filed Dec. 10, 1987 now abandoned.

BACKGROUND OF THE INVENTION

The present invention relates generally to ultrasonic distance measuring systems. More particularly, a capacitance type transducer is disclosed that maintains substantially constant transducer diaphragm tension.

Capacitive (Sell-type) ultrasonic transducers are well known to the prior art. The transducers typically incorporate textured backplate (piston) that includes an electrically conductive front surface. A diaphragm that includes an insulating dielectric layer and a conducting layer is stretched over the backplate and attached thereto by either an adhesive or a mechanical clamp. The diaphragm may be arranged to mechanically respond to pneumatic and electrical forces. However, the mechanical response of the diaphragm (i.e. its operating frequencies and its amplitude) is dependent upon the diaphragm's tension.

A significant problem with capacitance type ultrasonic transducers is that the diaphragms tend to flow or creep under the influence of a tension, which in effect results in the sagging of the diaphragm and a corresponding loss of tension. The creep is a permanent deformation or elongation of the diaphragm even though it is not stressed above its elastic limit. Creep occurs at relatively low stresses and temperatures in the flexible materials typically used as diaphragm components such as gold and Kapton film. It is particularly noticeable in transducers operating in higher temperature environments. Our experience has been that if creep is uncompensated for, 10-15% of all transducers fail due to lack of diaphragm tension. Several attempts have been made to design transducers that automatically compensate for diaphragm expansions. One considered approach is to use a highly elastic material as the diaphragm itself. However elastic diaphragms have relatively short lives and are limited to low tension and frequency applications. A second approach is to spring load the backplate against a restrained diaphragm. For example, in U.S. Pat. No. 4,440,482 Shenk discloses an acoustic transducer assembly that uses a leaf spring to press the backplate into diaphragm tensioning engagement with the insulative layer of the diaphragm. Similarly, U.S. Pat. No. 4,081,626 discloses an alternative spring arrangement that urges a floating backplate into engagement with the diaphragm to maintain tension in the event of long-term plastic flow in the diaphragm.

Spring biased floating backplate arrangements are mechanically convenient and are effective at higher tensions and frequencies. However, they have several drawbacks. Most notably, as creep occurs, the position of the backplate relative to a target actually moves. This is problematic in many different situations such as when the measured distances are short, the system has very fine resolution and/or a reference target is being used. Modern transducers are capable of measuring distances to precisions on the order of one thousandth of an inch. Therefore, even small movements of the backplate due to creep compensation can significantly degrade the performance of the transducer. Another drawback of a movable backplate is that backplate misalignment may occur due to uneven creep compensation. Such misalignment will attenuate the strength of a returning signal. Additionally, floating backplate arrangements make it virtually impossible to create a positive seal between the diaphragm and the backplate. Thus the harsh environments typically surrounding industrial applications lead to undesirably high failure rates. Contamination between the backplate and the diaphragm can promote electrostatic charge accumulation, mechanically alter the systems response, and form corrosion on the backplate surface. Any of these problems can alter the characteristics of the transducer and would reduce the overall transducer accuracy. Backplate corrosion acts much like a layer of dielectric material and can adversely alter the transducers characteristics.

SUMMARY OF THE INVENTION

Therefore, it is a primary objective of the present invention to provide an improved ultrasonic transducer assembly that is particularly well suited for compensating for diaphragm creep.

Another object of the present invention is to provide a diaphragm tensioning mechanism that maintains a substantially constant tension on the diaphragm.

Another object of the invention is to provide a diaphragm tensioning arrangement that does not require a floating backplate and facilitates a positive seal between the backplate and the diaphragm.

To achieve the foregoing and other objects and in accordance with the purpose of the present invention, an ultrasonic transducer assembly is provided that includes a base having a front surface and a flexible insulating diaphragm. The base includes a textured backplate portion that occupies at least a portion of the front surface of the base. The front surface of the backplate is electrically conductive. A groove is provided in the base that opens into the base's front surface. The flexible insulating diaphragm includes a dielectric layer and a conducting layer. The dielectric layer is adapted to contact the backplate while the conductor layer is electrically isolated from the backplate. A tension element is disposed within the groove and connected to the diaphragm for maintaining diaphragm tension. Preferably, a load means is provided for maintaining a substantially constant load on the tension element which in turn maintains substantially constant diaphragm tension.

BRIEF DESCRIPTION OF THE DRAWINGS

The features of the present invention that are believed to be novel are set forth with particularity in the appended claims. The invention, together with further objects and advantages thereof, may best be understood by reference to the following description of the presently preferred embodiment taken in conjunction with the accompanying drawings in which:

FIG. 1 is a side view of a sell type transducer incorporating the present invention.

FIG. 2 is an exploded view of the transducer shown in FIG. 1.

FIG. 3 is a diagrammatic cross sectional view of the backplate and foil assembly shown in FIG. 1.

FIG. 4 is a top plan view of the backplate base assembly shown in FIG. 3.

FIG. 5 is a schematic diagram showing the effect of the tensioning arrangement on the diaphragm.

DETAILED DESCRIPTION OF ILLUSTRATIVE EMBODIMENTS

As illustrated in the drawings, an ultrasonic probe 1 in accordance with the present invention includes a main housing 3, a reference bar assembly 4, a base 5 that carries a textured piston or backplate 7, a flexible insulating diaphragm 9 having an insulating layer 11 and a conducting layer 13, a tension element 15, and load means 16 for maintaining a substantially constant load on the tension element 15.

In general, the ultrasonic transducer assembly of the present invention is comprised of a piston or backplate 7 having a substantially planar textured front surface 8 which is formed of a conducting material. It also consists of an insulating diaphragm (foil) or dielectric film having an insulating layer that overlays the substantially planar front surface of the backplate and a conductive layer electrically isolated from the backplate. By way of example, the textured backplate may include a plurality of spaced apart support elements 40 that are disposed between the substantially planar surface of the backplate 7 and the insulating back surface of the diaphragm 9. The support elements 40 may be formed of either a conducting or an insulating material. A detailed description of an appropriate piston (backplate) assembly is provided in U.S. Pat. No. 4,695,986, which is incorporated herein by reference. As described therein, the flexible insulating diaphragm 9 has an insulating layer 11 and a conducting layer 13. The insulating layer may be formed of a suitable material such as Kapton film. The conducting layer 13 may be formed of gold which is deposited on the outer surface of the Kapton film by suitable means such as evaporation. A suitable thickness for the gold film is, for example, 350A ±50%.

The plurality of spaced apart support elements are provided to enhance the emitted ultrasonic signal. In order that the transducer assembly emits ultrasonic energy at a relatively uniform frequency, it is desirable that the spacing between the support elements 40 be relatively uniform and also that the support element have a relatively uniform height. It is also desirable that the support elements have predetermined height so that a predetermined frequency output will be provided by the transducer assembly.

In the embodiment shown in the drawings the backplate 7 is recessed within a base 5 which includes an aperture for receiving the backplate such that the front surface 8 of the backplate 7 will be substantially coplanar with the front surface 6 of the base 5. The base includes a groove 31 that extends into its front surface 6 and is adapted to receive tension ring 15.

The diaphragm 9 is fixably secured to base 5 by any suitable means such as by chemical bonding or mechanical clamping. As seen in FIG. 1, this may be accomplished mechanically by threading reference bar assembly 4 down upon clamp ring 19 which clamps the diaphragm against base 5, thereby securely holding the diaphragm 9 in place. The attachment between diaphragm 9 and base 5 may be further secured by using a suitable adhesive such as Loctite Super Bonder 414.

Reference bar assembly 4 includes a female plug 34 having a coupling ledge 35 with a plurality of screw holes 36 sunk therein to facilitate attachment to the housing 3. Additionally, a pair of support arms 37 carry a reference bar 38 that is spaced apart a predetermined distance from the backplate 7.

It will be appreciated that the diaphragm 9 may be pretensioned to a predetermined tension to facilitate operation at a predetermined frequency. However, as explained above, the soft materials that are frequently used to form the diaphragm are susceptible to creep. Therefore, the present invention provides means for maintaining a relatively constant tension on the diaphragm 9 even if creep occurs. In the embodiment described, means are provided for applying a load to the front surface of the diaphragm to maintain diaphragm tension. The load is preferably substantially perpendicular to the planar front surface of backplate 7.

Referring specifically to FIG. 2, a groove 31 is placed in the front surface 6 of base 5. The groove 31 is adapted to receive a tension element 15 which is laid over the diaphragm. The tension element 15 is the same shape as the groove 31 but is somewhat narrower. Its width is chosen so that the ring and diaphragm may be received within the groove. The depth of the groove 31 is adjusted so that when the desired load is applied to the diaphragm by tension element 15, the tension element will be suspended within the groove rather than resting against its bottom or sides Thus, the load applied by tension element 15 controls the tension of diaphragm 9. Initial diaphragm tension is established by a load applied to the tension element and the movement of the tension element and diaphragm into the groove. The tension element may be loaded by any suitable means including mechanical, gravitational or electrical force. If creep occurs, less resistance would be provided by diaphragm 9 against tension element 15. Thus, the tension element 15 would further recess into groove 31 thereby absorbing the slack caused by the diaphragm creep and maintaining diaphragm tension. Tension will be maintained until the diaphragm material flows to failure or the tension element reaches the bottom of the groove. If a substantially constant load is maintained upon the diaphragm, then the diaphragm tension will remain substantially constant.

The groove may take any form suitable for maintaining tension within the diaphragm 9. By way of example, as seen in FIG. 4, an annular groove disposed on the front surface 6 of base 5 outside of the backplate 7 adjacent to the attachment mechanism for the diaphragm is an appropriate construction. However, it should be appreciated that the base 5 and backplate 7 could be combined into a single structure wherein the groove is disposed within the backplate itself. An annular ring would be appropriate shape for the tension element used in conjunction with an annular groove. To maintain a relatively constant load on the tension ring 15, a wave spring 17 is disposed immediately thereover. Wave springs are known for their ability to maintain relatively constant loads throughout their displacements. Wave type springs are also compact and can be designed with a relatively low spring rate so that a great deal of tension ring movement is required before the wave spring returns to its free length.

As seen in FIGS. 1 and 2, the wave spring 17 is held in place by bezel 21. The bezel includes a top flange 40, a side panel 43 and an interior opening 45. The top flange is adapted to extend over clamp ring 19 in between the clamp ring 19 and shoulder 47 of reference bar assembly 4. Thus, when reference bar assembly 4 is threadably tightened on housing 3, the position of the top flange 41 of the bezel 21 is positively located. The bezel therefore provides a compressive load to the wave spring 17 which in turn is transmitted through tension ring 15 to the diaphragm 9. The magnitude of the load is regulated by the spring characteristics of wave spring 17.

Referring specifically to FIG. 5, the mechanics of the diaphragm tensioning arrangement will be described. As discussed above, the periphery of the diaphragm 9 is firmly secured to the base 5. Thus, any creep within the diaphragm will cause diaphragm sagging. Tension element 15 engages the front surface of the diaphragm and is sized and positioned to fit within groove 31 on base 5. A load is then applied to the tension element which presses a portion of the diaphragm into the groove. The load is preferably substantially orthogonal to the planar front surface 6 of base 5. Therefore, it should be appreciated that the tension element does not press the diaphragm into contact with either the bottom or the sides of the groove. Thus, the load applied to tension element 15 determines the tension upon diaphragm 9. As creep occurs, the diaphragm expands. As creep occurs, the tension element 15 is pressed further into groove 31 thereby absorbing the slack within diaphragm 9. So long as a substantially constant load is maintained upon tension element 15, the tension within diaphragm 9 will remain substantially the same thereby ensuring that the transducer characteristics will not vary substantially over time. Since one end of the diaphragm 9 is fixed in place, the tension element 15 will only need to recess within groove 31 only one-half the distance of the film flow.

Typically, a diaphragm would be expected to creep no more than about 0.07 inches per inch in length. Therefore, for a transducer having a 0.85 inch diameter diaphragm with an annular groove 31, an appropriate groove depth would be in the range of 0.015 to 0.020 inches As can be seen with reference to FIG. 5, as creep occurs, and the tension element is further recessed within groove 31, a portion of the diaphragm must slide past the tension element. Experiments using transducer assemblies that utilize gold as the diaphragm's conductive layer (which forms the diaphragm's front surface) have encountered problems associated with the tension element scraping off the gold conducting layer when creep occurs and the diaphragm slides by the tension element as it recesses further into the groove. Therefore, the edges of the tension element should be smoothed and/or polished if appropriate. The tension element is preferably formed of a material having a slick surface. By way of example, steel and delrin are suitable tension element materials. Alternatively, the tension ring could be coated with a slick material such as Teflon ™.

In embodiments where scrapping causes substantial problems, narrow radial channels could be cut into the bottom surface of tension element 15 where it engages the diaphragm. The narrow channels would eliminate friction in their immediate vicinity and insure that an electrically conductive path remain layer even if substantial scraping occurs.

The grooves may take any geometric form that is suitable for absorbing diaphragm expansion. However, continuous grooves are preferred to prevent foil wrinkling. The annular groove described is well suited for applications wherein a direct relationship between film elongation and tension ring movement is desired. However, it should be appreciated that many other geometric forms that could be used as well. For instance, multiple grooves and tension elements could be used to compound the relationship between film elongation and tension ring movement. Alternatively, a single tension element could be placed along only one edge of the diaphragm to accomplish the same purpose.

Although only a few embodiments of the present invention have been described in detail, it should be understood that the present invention may be embodied in many other specific forms without departing from the spirit or scope of the invention. Particularly, it should be understood that the present invention relates to an apparatus for, and a method of maintaining diaphragm tension. Therefore, the invention may be applied to any capacitive (Sell-type) acoustic transducer. Of course, the actual texturing of the backplate, the presence or absence of support elements, the materials used to fabricate the diaphragm, etc. may all be widely varied within the scope of the present invention. Similarly, it should be appreciated that the actual tensioning arrangement can be widely varied. Load providing mechanism other than the wave springs/bezel arrangement described may be used to apply a relatively constant load to a tension element.

Additionally, it will be appreciated by those skilled in the art, that a wide variety of groove or ridge arrangements could be provided to receive the diaphragm slack. Therefore, the present examples and embodiments are to be considered as illustrative and not restrictive, and the invention is not to be limited to the details given herein, but may be modified within the scope of the appended claims.

We claim:

1. An ultrasonic transducer assembly having a front and a back, the transducer assembly comprising:
   a base having a front surface and including a backplate that occupies at least a portion of the front surface of the base, the front surface of the backplate being textured and electrically conductive, and a groove opening into the front surface of the base;
   a flexible insulating diaphragm having an insulating layer and a conducting layer, the insulating layer being adapted to contact the backplate and the conducting layer being electrically isolated from the backplate, said diaphragm being fixedly coupled to the base; and
   tension means for engaging the front surface of the diaphragm and pressing a portion of the diaphragm into the groove to tension the diaphragm, said tension means including a tension element for engaging the diaphragm and load means for pressing the tension element and the diaphragm into the groove to assure diaphragm tension, said load means maintains a substantially constant load on the spring tension element to maintain a substantially constant diaphragm tension, said load means including a wave spring that overlies the tension element.

2. An apparatus for detecting the distance to an object using ultrasonic energy comprising:
   a housing;
   a backplate having a textured and electrically conductive front surface
   a base carried by the housing for supporting the backplate in a fixed position, the base having a front surface and including a groove opening into the front surface;
   a flexible insulating diaphragm having an outer margin and having a dielectric layer and a conducting layer, the dielectric layer being facing the backplate and the conducting layer facing away from the backplate;

a tension element for engaging the front surface of the diaphragm and for pressing a portion of the diaphragm spaced inwardly from the outer margin of the diaphragm into the groove to tension the diaphragm;

load means including annular spring means for maintaining a substantially constant load on said tension element to cause the tension element to maintain substantially constant diaphragm tension;

claim means disposed exteriorly of the tension element for securely fastening the outer margin of the diaphragm to the base and holding said tension element and load means in place;

a reference bar mounted on the housing for reflecting ultrasonic energy to create an echo, the reference bar being position between the backplate and the object with the reference being at a known distance from the backplate; and means for applying a voltage between said diaphragm and said backplate for stimulating the diaphragm to emit acoustic signals.

3. An apparatus as recited in claim 2 wherein said clamp means includes a clamp ring for securely fastening the diaphragm to the base.

4. An apparatus for detecting the distance to an object using ultrasonic energy comprising:

a housing;

a backplate having a textured and electrically conductive front surface a base carried by the housing for supporting the backplate, the base having a front surface and including a groove opening into the front surface;

a flexible insulating diaphragm having a dielectric layer and a conducting layer, the dielectric layer being adapted to contact the backplate and the conducting layer being electrically isolated from the backplate;

a tension element for engaging the front surface of the diaphragm and a pressing a portion of the diaphragm into the groove to tension the diaphragm;

load means for maintaining a substantially constant load on said tension element to cause the tension element to maintain substantially constant diaphragm tension;

clamp means for securely fastening the diaphragm to the base and holding said tension element and load means in place;

a reference bar mounted on the housing for reflecting ultrasonic energy to create an echo, the reference bar being positioned between the backplate and the object with the reference bar being a known distance from the backplate; and means for applying a voltage between said diaphragm and said backplate for stimulating the diaphragm to emit acoustic signals, said clamping means including a clamp ring for securely fastening the diaphragm tot he base, said load means including a wave spring.

5. An apparatus as recited in claim 4 wherein said clamp means further includes a retaining member having a flange and an interior opening, said flange being secured between the clamping ring and the reference bar pressing against said wave spring to compress the wave spring, and said interior opening exposing the diaphragm.

6. An apparatus as recited in claim 5 wherein said housing, base, backplate, tension element, wave spring, retaining member and clamp ring are all circular.

7. In an ultrasonic transducer assembly, a housing, a piston fixedly coupled to the housing, the piston having a front surface, a flexible diaphragm overlying the front surface of the piston and having an outer margin extending beyond the outer extremity of the front surface, and cooperative means carried by the housing and engaging the outer margin of the diaphragm for applying tensioning force to the diaphragm so that the diaphragm is relatively taut in the region overlying the front surface, said cooperative means including an annular recess, said outer margin of said diaphragm extending across said recess, and an O-ring for engaging said diaphragm and being seated in said groove to clamp said outer margin of said diaphragm in the groove to tension said diaphragm, said cooperative means also including yieldable means for yieldably urging said O-ring into said recess, said yieldable means being a circular wave spring.

8. In a transducer for use in an ultrasonic apparatus, a housing, a backplate mounted in a fixed position in the housing and having a front surface, at least a portion thereof which is substantially planar and conductive, a flexible diaphragm overlying said planar portion of the front surface of the backplate and being comprised of a dielectric layer which faces said planar portion and a conducting layer which faces away from the planar portion, means clamping the outer margin of the diaphragm to the backplate so that it is tensioned over the planar surface and tensioning means including annular spring means disposed interiorly of the clamping means and engaging the diaphragm on the side away from the backplate to maintain a substantially constant tension on the diaphragm to accommodate changes in the dimensions of the diaphragm.

9. A transducer as in claim 8 wherein said tensioning means disposed interiorly of the clamping means includes an annular recess having a bottom wall and spaced apart side walls formed in the backplate spaced interiorly of the outer margin of the diaphragm and spaced away from said planar portion of the backplate, an annular member overlaying the diaphragm in the region of the annular recess, said annular member having dimensions which are substantially less than that of the annular recess and loading means carried by the housing for yieldably urging said annular member in a direction so that the annular member is moved in engagement with the diaphragm to move the portion of the diaphragm overlying the recess into the recess to apply a substantially uniform tension to the diaphragm, said annular member with said portion of the diaphragm engaged thereby being spaced from the sidewalls and the bottom wall of the annular recess whereby in the event of a changing in a dimension of the diaphragm, the annular member will be moved under the urging of the yieldable force to continue to maintain a substantially constant tension on the diaphragm.

10. A transducer as in claim 9 wherein said loading means applying a yieldable force comprises spring means.

11. A transducer as in claim 8 together with adhesive means forming a bond between the outer margin of the diaphragm and the backplate to ensure that the outer margin of the diaphragm is firmly secred to the backplate.

12. In a transducer for use in an ultrasonic apparatus, a housing, a backplate mounted in a fixed position in the housing and having a front surface, at least a portion thereof which is substantially planar and conductive a flexible diaphragm overlying said planar portion of the front surface of the backplate and being comprised of a dielectric layer which faces said planar portion and a conducting layer which faces away from the planar portion, means clamping the outer margin of the diaphragm to the backplate so that it is tensioned over the planar surface and tensioning means disposed interiorly of the clamping means and engaging the diaphragm on the side away from the backplate to maintain a substantially constant tension on the diaphragm to accommodate changes in the dimensions of the diaphragm, said tensioning means being disposed interiorly of the clamping means and including an annular recess having a bottom and spaced apart side walls formed in the backplate spaced interiorly of the outer margin of the diaphragm and spaced away from said planar portion of the backplate, an annular member overlying the diaphragm in the region of the annular recess, said annular member having dimensions which are substantially less than that of the annular recess and loading means carried by the housing for yieldably urging said annular member in a direction so that the annular member is moved in engagement with the diaphragm to move the portion of the diaphragm overlying the recess into the recess to apply a substantially uniform tension to the diaphragm, said annular member with said portion of the diaphragm engaged thereby being spaced from the sidewalls and the bottom wall of the annular recess whereby in the event of a change in a dimension of the diaphragm, the annular member will be moved under the urging of the yieldable force to continue to maintain a substantially constant tension on the diaphragm, said loading means being a wave spring.

13. In a method for tensioning the diaphragm of a transducer which has a housing, a backplate mounted in a fixed position in the housing and having a front surface at least a portion thereof which is substantially planar and conductive, the flexible diaphragm overlying the planar portion of the front surface of the backplate and in which clamping means secures the outer margin of the diaphragm to the backplate, the backplate having an annular groove underlying the diaphragm interiorly of the clamping means, the method applying comprising a yieldable annular spring-like force tot he side of the diaphragm facing away from the backplate in a region spaced interiorly from the clamping means overlying the annular groove to maintain a substantially constant tension on the diaphragm to accommodate changes in the dimensions of the diaphragm.

* * * * *